(12) United States Patent
Kaiser et al.

(10) Patent No.: US 12,427,565 B2
(45) Date of Patent: Sep. 30, 2025

(54) DEVICE AND METHOD FOR PRODUCING A SPUR TOOTHING

(71) Applicant: Schaeffler Technologies AG & Co. KG, Herzogenaurach (DE)

(72) Inventors: Andreas Kaiser, Werneck (DE); Daniel Koenig, Grafenrheinfeld (DE); Frank Eichelmann, Donnersdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/694,594

(22) PCT Filed: Sep. 8, 2022

(86) PCT No.: PCT/DE2022/100662
§ 371 (c)(1),
(2) Date: Mar. 22, 2024

(87) PCT Pub. No.: WO2023/066419
PCT Pub. Date: Apr. 27, 2023

(65) Prior Publication Data
US 2025/0121427 A1 Apr. 17, 2025

(30) Foreign Application Priority Data
Oct. 20, 2021 (DE) .................. 10 2021 127 188.6

(51) Int. Cl.
*B21K 1/30* (2006.01)
*B23F 5/16* (2006.01)
*B23F 15/06* (2006.01)

(52) U.S. Cl.
CPC .................. *B21K 1/30* (2013.01); *B23F 5/16* (2013.01); *B23F 15/06* (2013.01)

(58) Field of Classification Search
CPC ... B21K 1/30; B21K 1/40; B21J 9/025; B23F 5/16
See application file for complete search history.

(56) References Cited

U.S. PATENT DOCUMENTS

| | | | |
|---|---|---|---|
| 2011/0061238 A1* | 3/2011 | Sera | F16C 33/60 29/898.04 |
| 2012/0148360 A1 | 6/2012 | Heinemann et al. | |

(Continued)

FOREIGN PATENT DOCUMENTS

| | | |
|---|---|---|
| CN | 106514126 A | 3/2017 |
| EP | 0377124 A2 | 7/1990 |

(Continued)

*Primary Examiner* — Kyle A Cook
(74) *Attorney, Agent, or Firm* — Matthew Evans (57) ABSTRACT

A device for producing a spur toothing includes a tool holder arranged for rotational drive about a drive axis and longitudinal displacement along the drive axis, and a tool arranged on the tool holder. The tool includes an end face, a mating toothing disposed on the end face and arranged for forming a spur toothing on a workpiece, and a longitudinal axis arranged at an angle to the drive axis such that the longitudinal axis meets the drive axis at a wobble point. The mating toothing has a tooth base plane and the wobble point is disposed on the drive axis in front of or behind the tooth base plane such that, through rotary drive and longitudinal displacement of the tool holder with the associated wobbling rolling of the tool on the workpiece, the spur toothing formed by the mating toothing has a number of teeth that is unequal to a number of teeth of the mating toothing.

17 Claims, 4 Drawing Sheets

(56) References Cited

U.S. PATENT DOCUMENTS

| | | | |
|---|---|---|---|
| 2017/0209914 A1* | 7/2017 | Hagiwara | B21K 1/40 |
| 2019/0240722 A1* | 8/2019 | Kikuchi | B60B 27/0084 |
| 2022/0143679 A1* | 5/2022 | Hagiwara | F16C 43/04 |
| 2024/0066616 A1* | 2/2024 | Schieke | B23F 5/163 |

FOREIGN PATENT DOCUMENTS

| | | | |
|---|---|---|---|
| EP | 0377124 A3 | 1/1992 | |
| EP | 3173164 B1 | 1/2021 | |

\* cited by examiner

DEVICE AND METHOD FOR PRODUCING A SPUR TOOTHING

CROSS-REFERENCE TO RELATED APPLICATIONS

This application is the United States National Phase of PCT Appln. No. PCT/DE2022/100662 filed Sep. 8, 2022, which claims priority to German Application No. DE102021127188.6 filed Oct. 20, 2021, the entire disclosures of which are incorporated by reference herein.

TECHNICAL FIELD

The present disclosure relates to a device and a method for producing a spur toothing on a workpiece.

BACKGROUND

Spur toothings are used for axially acting couplings between two rotating components such as shafts or the like. Spur toothings are also known as Hirth couplings. Such spur toothings conventionally have a toothed rim running around an axis of rotation, which toothed rim, in the optimal case, achieves play-free engagement in a mating toothing facing the spur toothing. As a rule, spur toothings are produced by machining, for example milling, or by forming, for example by wobble riveting. Generic spur toothings are used, for example, on wheel bearings to transmit rotary motion between the drive shaft and the respective wheel operatively connected thereto.

To carry out the wobble riveting process, a tool head intended for rotational drive about a drive axis is provided and is arranged at an angle to the drive axis of a tool holder. The longitudinal axis of the tool head and the drive axis of the tool holder intersect at a point of intersection termed the wobble point. The inclination of the tool head is designed in such a way that a counter surface of the tool head acting on the workpiece to be machined lies at this point of intersection on the drive axis. When the tool holder is driven rotationally about the drive axis thereof, the inclined tool head performs a wobbling motion around the wobble point, during which the longitudinal axis of the tool head is guided on a conical path. Any axis point of the tool head located at a distance from the point of intersection on the longitudinal axis describes a circular path around the workpiece axis, while the counter surface located at the axis intersection point remains stationary and only performs a wobbling pivoting movement at the point of intersection or at the wobble point.

By axially advancing the tool holder onto the workpiece to be machined, the wobbling counter surface of the tool head comes into contact with the workpiece. Through further uniform or oscillating axial advance, the wobbling counter surface shapes the end face of the workpiece. The material of the workpiece begins to flow and is cold-formed. During wobble riveting, the tool describes a wobbling movement on a circular path.

The counter surface of the tool head can, for example, be designed as a mating toothing, wherein the wobbling movement forms a spur toothing on the end face of the workpiece. Here, the counter surface contacts the end face of the workpiece along a line the length of which corresponds to half the diameter of the counter surface. For a clean riveting result, it is necessary for the counter surface or the mating toothing of the tool to lie as precisely as possible at the point of intersection of the longitudinal axis of the tool head and the drive axis of the tool holder. In the case of mating toothing on the tool head, the wobble point conventionally lies in a tooth base plane of the mating toothing. The tooth base plane is understood to mean a plane arranged radially relative to the longitudinal axis of the tool head and which divides the teeth of the mating toothing designed as a spur toothing substantially centrally. If the wobble point is in the tooth base plane, a toothing on the workpiece with an identical number of teeth is created using the mating toothing on the tool head.

SUMMARY

The present disclosure provides an improved device and an improved method for producing a spur toothing. For example, process forces are reduced when producing the spur toothing.

A device according to the disclosure for producing a spur toothing includes a tool holder with a tool arranged thereon, the tool having a mating toothing on the end face for forming a spur toothing on a workpiece. The tool holder is designed for rotational drive about a drive axis and for longitudinal displacement, and a longitudinal axis of the tool being is at an angle to the drive axis of the tool holder such that the longitudinal axis of the tool meets the drive axis of the tool holder at a wobble point. The wobble point is offset in relation to a tooth base plane of the mating toothing of the tool along the drive axis in front of or behind the tooth base plane in such a way that, through rotary drive and longitudinal displacement of the tool holder with the associated wobbling rolling of the tool on the workpiece, a toothing with a number of teeth that is not equal to the number of teeth of the mating toothing of the tool is produced on the workpiece.

In other words, the longitudinal axis of the tool is arranged at an angle to the drive axis of the tool holder such that the center of the mating toothing-forming end face of the tool lies on the tooth base plane, the drive axis of the tool holder and at the wobble point. Using the example of a substantially vertically oriented drive axis, on which the tool holder is substantially vertically movable to produce the spur toothing, the tool is arranged obliquely or inclinedly on the tool holder in such a way that the wobble point is located either above or below the tooth base plane relative to the longitudinal axis of the tool holder relative to an axis of gravity.

The tool holder is designed to receive the tool for producing the spur toothing. A spur toothing is to be understood, for example, as a Hirth coupling. For this purpose, the tool holder has a receptacle which is designed such that the tool can be replaced.

The inclination of the tool relative to the tool holder is designed in such a way that the mating toothing of the tool acting on the workpiece to be machined lies at the wobble point on the drive axis. Rotation of the tool holder brings about the wobbling pivoting motion of the tool, in which the longitudinal axis of the workpiece moves on a conical path. The mating toothing is selected depending on the wobble point in such a way that the toothing can be formed on the workpiece. As the mating toothing rolls on the workpiece, the material of the workpiece begins to flow, such that the toothing is formed on the workpiece through plastic deformation.

The axial direction and the radial direction are to be understood either in relation to the mating toothing on the end of the tool or in relation to the drive axis of the tool holder. In relation to the tool holder, this means that the axial direction of the tool holder extends along a central or rotational axis of the tool holder and the radial direction extends along a radius of the tool holder. The drive axis may be arranged aligned with a longitudinal axis of the workpiece, e.g., aligned with a center of the toothing formed on the workpiece. In relation to the tool inclined at an angle to the drive axis, this means that the axial direction extends along a central or rotational axis of the end-side mating toothing and the radial direction extends along a radius of the mating toothing.

By offsetting the wobble point relative to the tooth base plane, a modified rolling diameter and a modified rolling circumference can be generated on the workpiece. For example, if the tool with 30 teeth is rolled on a smaller circumference of the workpiece with space for only 29 teeth, the tool skips one tooth per revolution. In other words, with each revolution of the tool, the respective tooth of the mating toothing is guided into the adjacent tooth gap in the toothing on the workpiece in the circumferential direction. The tool therefore rolls one tooth less on the circumference, wherein the tool tooth moves one tooth further after one rotation of the riveting die.

According to one exemplary embodiment, the wobble point is offset in relation to the tooth base plane of the mating toothing of the tool along the drive axis in the direction of the tool holder, such that, when the mating toothing rolls with wobble on the workpiece, a toothing with a number of teeth that is smaller than the number of teeth of the mating toothing of the tool is produced on the workpiece. The wobble point may be arranged offset so far along the drive axis from the tooth base plane in the direction of the tool holder, i.e., further away from the workpiece, that the workpiece has exactly one tooth and exactly one less tooth gap than the mating toothing of the tool. In this case, a rolling diameter and a rolling circumference of the tool on the workpiece are smaller than a rolling diameter or rolling circumference that can be generated by the mating toothing when the wobble point lies in the tooth base plane.

Alternatively, the wobble point is offset relative to the tooth base plane of the mating toothing of the tool along the drive axis in a direction opposite to the tool holder, such that, when the mating toothing rolls with wobble on the workpiece, a toothing with a number of teeth that is greater than the number of teeth of the mating toothing of the tool is produced on the workpiece. The wobble point may be arranged offset so far along the drive axis from the tooth base plane in the direction of the workpiece, i.e., further away from the tool holder, that the workpiece has exactly one tooth and exactly one tooth gap more than the mating toothing of the tool. In this case, a rolling diameter and a rolling circumference of the tool on the workpiece are greater than a rolling diameter or rolling circumference that can be generated by the mating toothing when the wobble point lies in the tooth base plane.

The present disclosure includes the technical teaching that the mating toothing has a plurality of teeth which are arranged adjacent one another in the circumferential direction and which extend in the radial direction, and every two teeth arranged adjacent one another are in each case spaced apart from one another by a tooth gap. Teeth and tooth gaps thus alternate at the end around the circumference. The geometric lines of the spur teeth meet centrally at a common point on the axis of rotation and the teeth thus extend in the radial direction towards the longitudinal axis of the tool.

According to one exemplary embodiment, the teeth of the mating toothing include a plurality of embossing teeth and a plurality of guide teeth. Thus, a first number of all the teeth of the mating toothing are designed as embossing teeth and a second number of all the teeth of the mating toothing are designed as guide teeth. The teeth of the mating toothing therefore fulfill partially different functions. For example, through differently designed teeth on the mating toothing of the tool, the axial load on the tool and the load on the device for producing the spur toothing may be reduced.

The embossing teeth are designed to shape the teeth on the workpiece. They thus form the negative form for the toothing formed on the workpiece during wobble riveting. In contrast, the guide teeth may, e.g., at the beginning of wobble riveting, preform the teeth on the workpiece and guide the tool during the wobbling pivoting movement along the already at least partially formed teeth or tooth flanks. The guide teeth thus contribute to the dimensional accuracy of the workpiece. At the end of production of the spur toothing on the workpiece, e.g., at the end of the axial feed travel of the tool holder, the tool must have wobbled so often that the mating toothing of the tool has completely formed every tooth or tooth gap on the workpiece. In other words, at the end of the production process, each tooth or each tooth gap of the toothing on the workpiece must have been stamped at least once by an embossing tooth.

For this purpose, at least two embossing teeth are in each case arranged adjacent one another in the circumferential direction of the mating toothing and spaced apart from one another by a respective tooth gap. Since the mating toothing is the negative form of the toothing on the workpiece, two adjacent embossing teeth are required to form or emboss a tooth with adjacent tooth gaps on both sides in the circumferential direction on the workpiece. Embossing is understood to mean local plastic deformation of the workpiece to form the respective tooth under pressure. Embossing causes material flow of the workpiece material. It is conceivable for more than two embossing teeth to be arranged adjacent in the circumferential direction and spaced apart from one another in each case by a tooth gap.

At least two embossing teeth and at least one guide tooth may be arranged alternately in the circumferential direction of the mating toothing. In other words, guide teeth and embossing teeth are arranged distributed alternately over the circumference, and at least two embossing teeth may be arranged adjacent and spaced apart from one another in each case by a tooth gap. For example, two embossing teeth can be arranged in the circumferential direction, a guide tooth, e.g., two or three guide teeth, adjacent thereto in the circumferential direction, two embossing teeth again adjacent thereto in the circumferential direction, and so on, and the teeth adjacent in the circumferential direction, regardless of their type of configuration or function, are arranged spaced apart from each other by one tooth gap.

To realize the different functions of the embossing teeth compared to the guide teeth, the embossing teeth each have a higher tooth tip in the axial direction of the tool than the guide teeth. The guide teeth accordingly have a tooth tip that is shorter in the axial direction of the tool. The tooth roots of the guide teeth and embossing teeth are each identically designed, and the guide teeth are merely cropped at the tooth tip. The identical tooth root ensures guidance of the mating toothing during wobbling motion.

Alternatively or additionally, tooth gaps between every two guide teeth arranged adjacent one another in the circumferential direction of the mating toothing and/or between a guide tooth and an embossing tooth arranged adjacent thereto in the circumferential direction of the mating toothing, are deeper in the axial direction of the tool than tooth gaps between two embossing teeth. In other words, the lowest point of a tooth gap between every two guide teeth arranged adjacent one another in the circumferential direction of the mating toothing or between a guide tooth and an embossing tooth arranged adjacent thereto in the circumferential direction of the mating toothing is offset backwards in comparison to a tooth gap between two embossing teeth in the axial direction of the tool, such that the tooth gap acts as a recess that is not used for final shaping of the respective tooth on the toothing of the workpiece. When rolling the mating toothing on the workpiece, material can flow into the deeper tooth gap, and this material, which protrudes compared with the final geometry of the toothing on the workpiece, is brought into the final shape when a tooth gap between two embossing teeth meets this preformed tooth. The embossing teeth and the tooth gap formed in each case between the two embossing teeth ultimately carry out the final shaping of the respective tooth of the toothing on the workpiece. This allows the embossing forces to be concentrated on the embossing teeth, and elimination of the embossing forces on the guide teeth results in less effort being required overall for deformation.

In a method according to the present disclosure for producing a spur toothing, a device for producing the spur toothing includes a tool holder with a tool arranged thereon, the tool having a mating toothing on the end face for forming the spur toothing on a workpiece. The tool holder is designed for rotational drive about a drive axis and for longitudinal displacement, with a longitudinal axis of the tool arranged at an angle to the drive axis of the tool holder such that the longitudinal axis of the tool meets the drive axis of the tool holder at a wobble point. The wobble point is offset relative to a tooth base plane of the mating toothing of the tool along the drive axis in front of or behind the tooth base plane, and the tool holder is axially displaced in the direction of the workpiece and rotationally driven about the drive axis thereof, such that the tool rolls with wobble on a surface of the workpiece to be machined in such a way that a toothing with a number of teeth which is unequal to the number of teeth of the mating toothing of the tool is formed on the workpiece.

The preceding description sections with examples and definitions of technical effects, advantages and embodiments of the device according to the present disclosure for producing the spur toothing on a workpiece also apply mutatis mutandis to the method according to the present disclosure for producing the spur toothing.

The spur toothing is used, for example, for wheel bearing assemblies with driven wheel bearings, e.g., for coupling a wheel bearing to a drive shaft or an axle journal. The spur toothing can therefore be used for the non-rotatable connection of a wheel bearing hub to an axle journal. Spur toothings in wheel bearing assemblies are exposed to high loads.

BRIEF DESCRIPTION OF THE DRAWINGS

Further measures improving the disclosure, together with the description of three exemplary embodiments, are described in greater detail below with reference to the figures, wherein identical or similar elements are provided with the same reference sign. In the figures.

DETAILED DESCRIPTION

Figure 1:
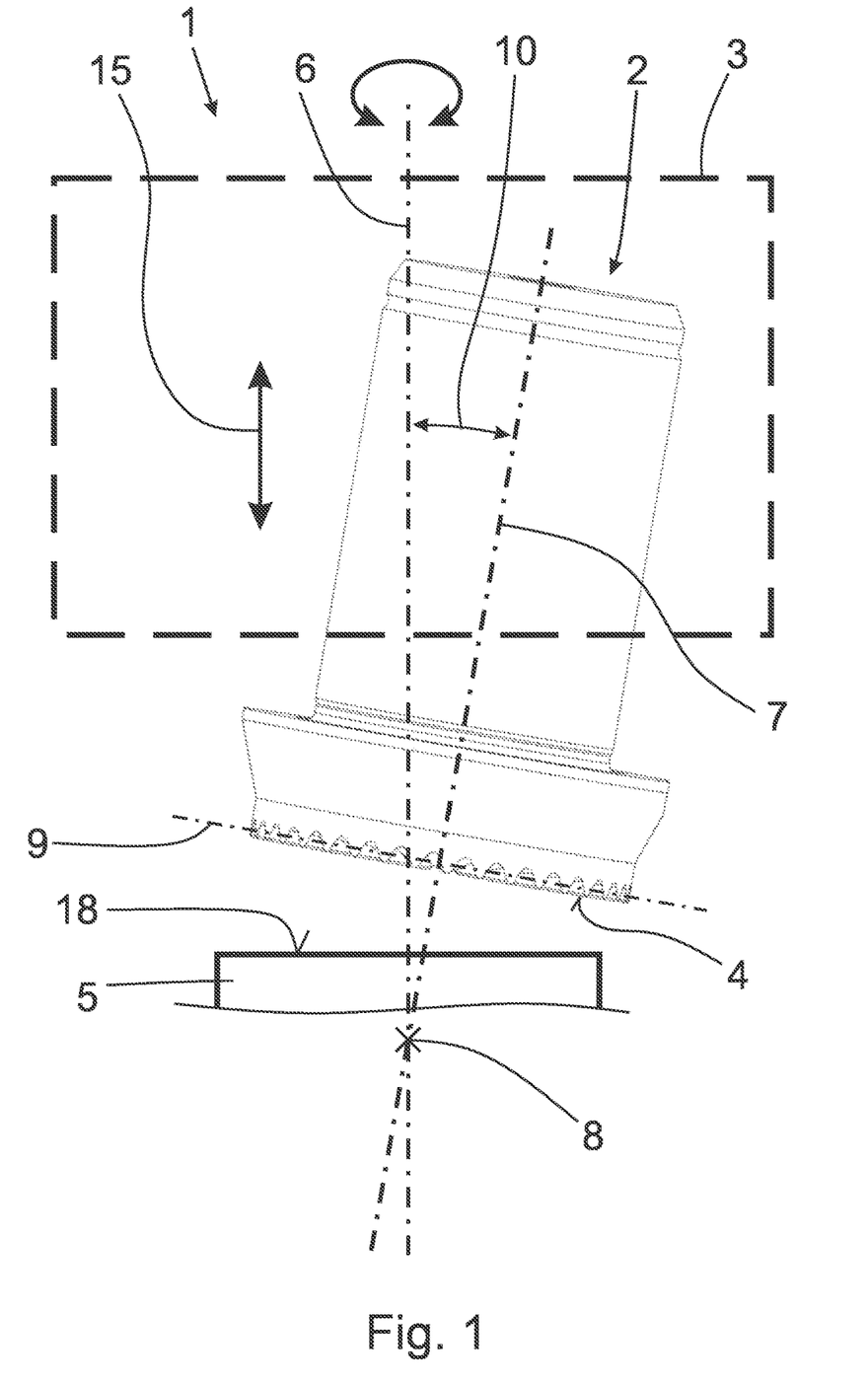
FIG. 1 shows a highly schematic view of a device for producing a spur toothing on a workpiece according to a first exemplary embodiment.
Figure 2:
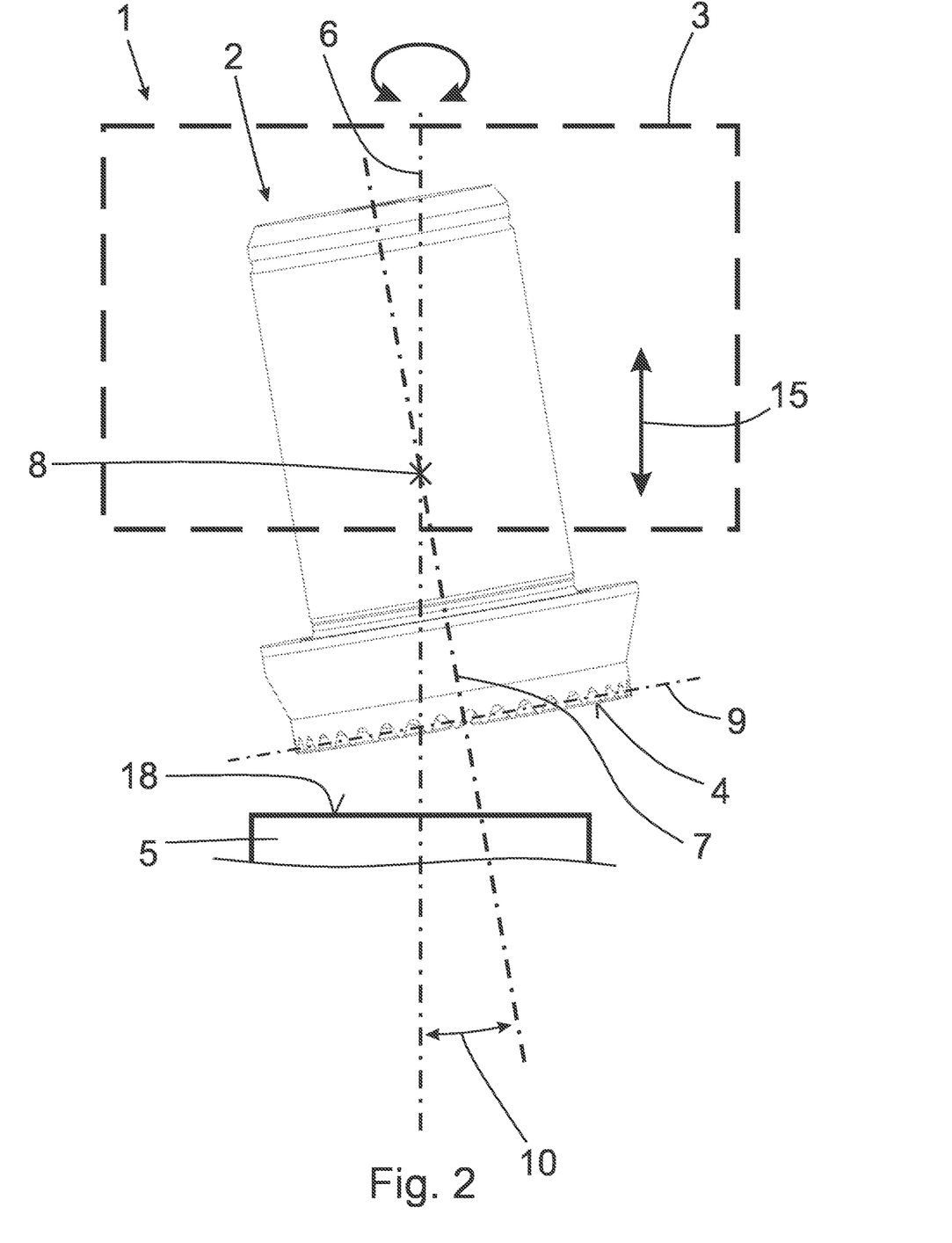
FIG. 2 shows a highly schematic view of the device for producing a spur toothing on a workpiece according to a second exemplary embodiment.

FIGS. 1 and 2 show two different exemplary embodiments of a device 1 for producing a spur toothing on a workpiece 5. The device 1 includes a tool holder 3 and a tool 2 arranged thereon. The tool 2 has a mating toothing 4 on the end face, i.e., facing the workpiece 5, for forming a spur toothing on the workpiece 5. The tool holder 3 is designed for rotational drive about a drive axis 6 and for longitudinal displacement along the drive axis 6 in a longitudinal displacement direction 15.

A longitudinal axis 7 of the tool 2 is arranged at an angle 10 to the drive axis 6 of the tool holder 3, in such a way that the longitudinal axis 7 meets the drive axis 6 at a wobble point 8. The center of the mating toothing 4, which is designed as a spur toothing, lies exactly on the longitudinal axis 7 of the tool 2. The center of the mating toothing 4 therefore also lies on the drive axis 6 of the tool holder 3.

In the first exemplary embodiment according to FIG. 1, the wobble point 8 is arranged offset relative to a tooth base plane 9 of the mating toothing 4 of the tool 2 along the drive axis 6 in front of the tooth base plane 9. In the present illustration, the wobble point 8 is thus arranged below the tooth base plane 9. In other words, the wobble point 8 is offset relative to the tooth base plane 9 of the mating toothing 4 of the tool 2 along the drive axis 6 in a direction away from the tool holder 3 or toward the workpiece 5.

If the tool holder 3 is set in rotational motion about the drive axis 6, this results in a wobbling motion of the tool 2, which is arranged obliquely relative to the drive axis 6. If the tool holder 3 is simultaneously displaced together with the tool 2 longitudinally or axially in the direction of the workpiece 5, the mating toothing 4 of the tool 2 rolls with wobble on an end face 18 of the workpiece 5 and thus creates a toothing—not shown in any greater detail here—with a number of teeth on the workpiece 5 through plastic deformation of the workpiece material. The number of teeth on the workpiece 5 depends on the position of the wobble point 8 relative to the tooth base plane 9 and the inclination of the tool 2.

In the first exemplary embodiment according to FIG. 1, the wobble point 8 is located at such a distance from the tooth base plane 9 on the drive axis 6 that in the wobble riveting process a number of teeth is produced on the workpiece 5 which is greater than the number of teeth of the mating toothing 4 of the tool 2, in this case by exactly one tooth. This means that the toothing on the workpiece 5 has exactly one tooth and one tooth gap more than the mating toothing 4 of the tool 2. By positioning the tool 2 in such a way relative to the drive axis 6 that the wobble point 8 lies in front of the tooth base plane 9 in the direction of the workpiece 5, a rolling diameter and a rolling circumference are generated on the workpiece 5 which are greater than an outer diameter or a circumference of the mating toothing 4 on tool 2.

In the second exemplary embodiment according to FIG. 2, the wobble point 8 is arranged offset relative to a tooth base plane 9 of the mating toothing 4 of the tool 2 along the drive axis 6 behind the tooth base plane 9. In the present illustration, the wobble point 8 is thus arranged above the tooth base plane 9. In other words, the wobble point 8 lies relative to the tooth base plane 9 of the mating toothing 4 of the tool 2 along the drive axis 6 in the direction of the tool holder 3 or on a side of the tooth base plane 9 opposite the workpiece 5.

In the second exemplary embodiment according to FIG. 2, the wobble point 8 is located at such a distance from the tooth base plane 9 on the drive axis 6 that rolling the tool 2 on the workpiece 5 produces a number of teeth that is smaller than the number of teeth of the mating toothing 4, in this case by exactly one tooth. This means that the toothing on the workpiece 5 has exactly one tooth and one tooth gap less than the mating toothing 4 of the tool 2. By positioning the tool 2 in such a way relative to the drive axis 6 that the wobble point 8 lies behind the tooth base plane 9 in the direction of the tool holder 3, a rolling diameter and a rolling circumference are generated on the workpiece 5 which are smaller than the outer diameter or the circumference of the mating toothing 4 on tool 2.

When producing the spur toothing on the workpiece 5, with each revolution of the tool holder 3 one tooth of the mating toothing 4 thus does not engage directly into the same tooth gap on the workpiece 5 for forming thereof. Rather, the respective tooth of the mating toothing 4 is guided in front of or behind the tooth base plane 9 into the previous or subsequent tooth gap, depending on the arrangement of the wobble point 8. At the end of the production process, the entire toothing on the workpiece 5 is formed dimensionally accurately.

Figure 3:
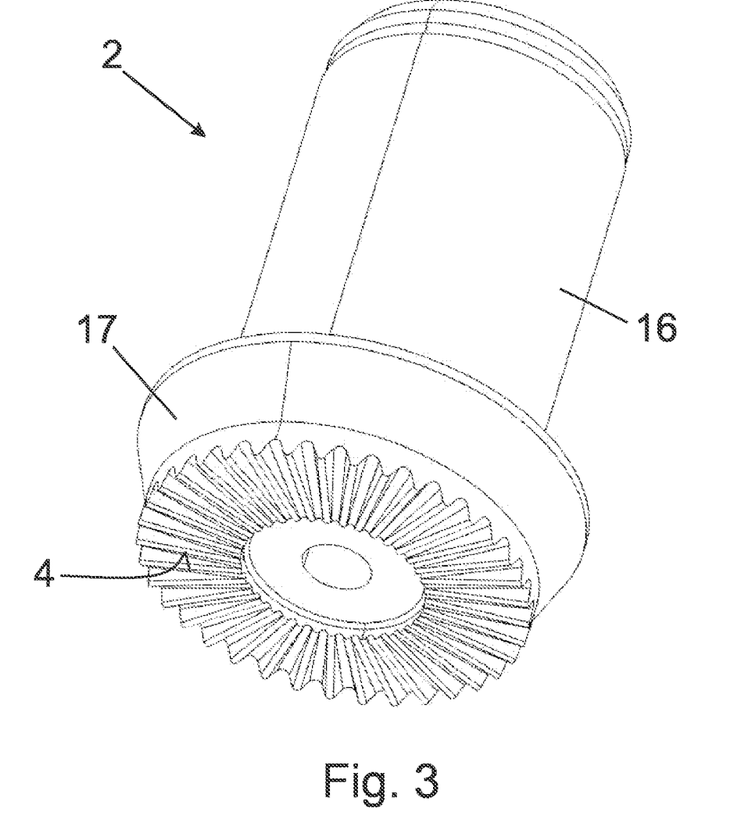
FIG. 3 shows a schematic perspective representation of a tool of the device according to FIG. 1 and FIG. 2.
Figure 5:
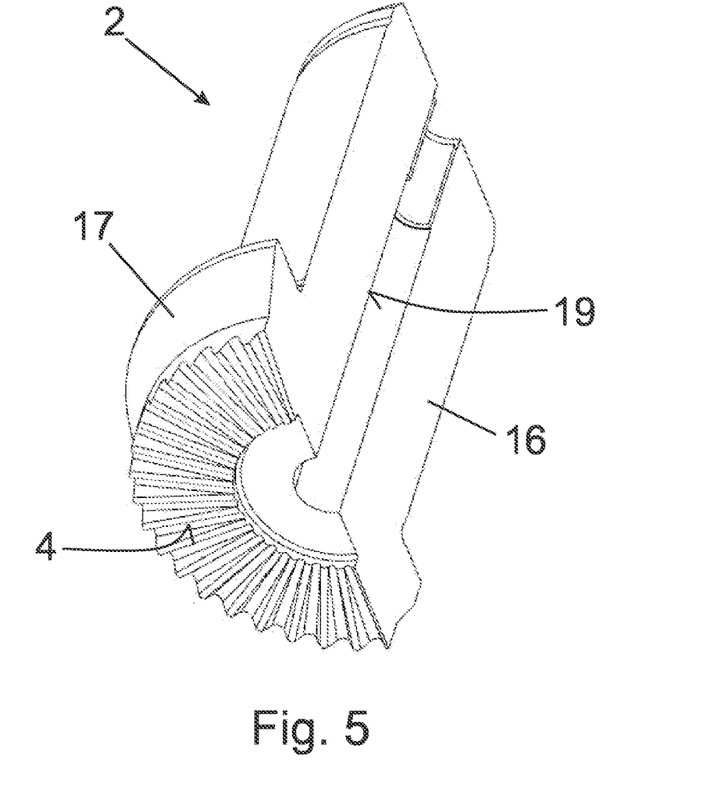
FIG. 5 shows a schematic perspective longitudinal sectional representation of the tool according to FIGS. 3 and 4.

FIG. 3 and FIG. 5 show the tool 2 extracted. The tool 2 has a shank 16 which is designed to connect the tool 2 to the tool holder 3. At one end of the shank 16, a radially widened region 17 is formed, on the free end face of which is formed the mating toothing 4. A bore 19 is provided coaxially to the longitudinal axis 7 of the tool 2, which bore is substantially designed to provide ventilation when fitting the tool 2 to the tool holder 3.

Figure 4:
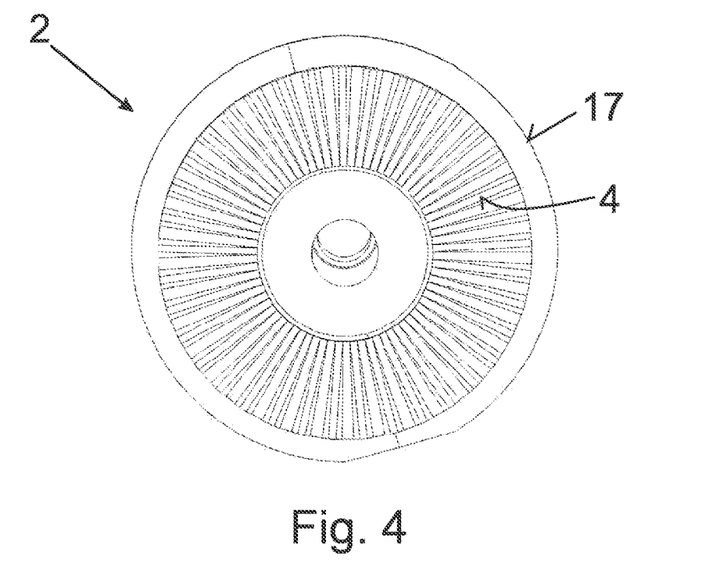
FIG. 4 shows a schematic end view of a mating toothing of the tool according to FIG. 3.
Figure 6:
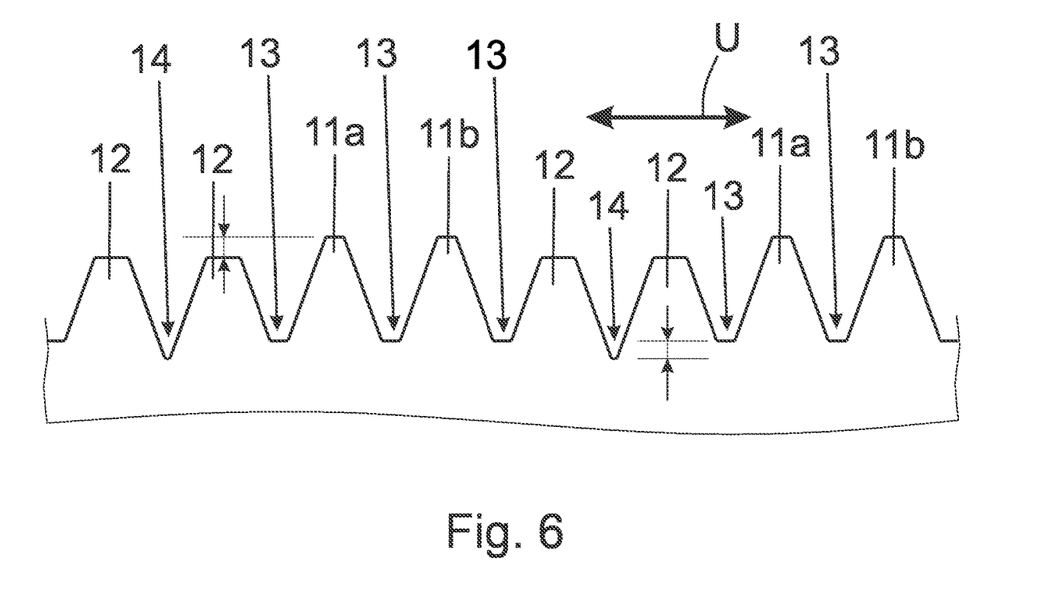
FIG. 6 shows a highly schematic representation of a developed view of the mating toothing of the tool according to FIGS. 3 to 5 illustrating the toothing profile.

In FIGS. 3 through 5, and shown in FIG. 6, the mating toothing 4 has a plurality of teeth 11a, 11b, 12, which are arranged adjacent one another in the circumferential direction and extend in the radial direction. Every two mutually adjacently arranged teeth 11a, 11b, 12 are in each case spaced apart from one another by a tooth gap 13, 14. The teeth 11a, 11b, 12 are oriented in such a way that, in an imaginary extension, they meet the longitudinal axis 7 of the tool 2 and extend in the radial direction relative to the longitudinal axis 7. The design and function of the teeth 11a, 11b, 12 and the tooth gaps 13, 14 of the mating toothing 4 are described in more detail below.

FIG. 6 shows a highly schematic representation of a developed view of the mating toothing 4. This figure shows the teeth 11a, 11b, 12 adjacent in the circumferential direction U, wherein a respective tooth gap 13, 14 is arranged in each case between two teeth 11a, 11b, 12, which gap spaces the teeth 11a, 11b, 12 apart from one another.

In the present case, the mating toothing 4 is designed such that the teeth 11a, 11b, 12 are designed differently to fulfill different functions. The mating toothing 4 thus comprises several embossing teeth 11a, 11b and several guide teeth 12. The embossing teeth 11 each have a higher tooth tip in the axial direction of the tool 2 than the guide teeth 12, because the embossing teeth 11a, 11b carry out the plastic deformation to shape the toothing on the workpiece 5, whereas the guide teeth 12 bring about guidance of the tool 2 during the wobbling motion and, at the beginning of the production process, for example, a pre-shaping of the toothing on the workpiece 5.

In the circumferential direction U of the mating toothing 4, two embossing teeth 11a, 11b are in each case arranged adjacent one another and spaced apart from one another by a respective tooth gap 13. By means of two embossing teeth 11a, 11b arranged adjacent one another with the first tooth gap 13 arranged therebetween, one tooth is in each case formed in its final contour on the workpiece 5. In the present case, two embossing teeth 11a, 11b and two guide teeth 12 are in each case arranged alternately in the circumferential direction U. The number of guide teeth 12 and embossing teeth 11a, 11b can be chosen arbitrarily; in any case, at least two embossing teeth 11a, 11b must be adjacent to one another. Between every two guide teeth 12 adjacent in the circumferential direction U a second tooth gap 14 is formed which is deeper in the axial direction of the tool 2 than the tooth gaps 13 between every two embossing teeth 11a, 11b. This results in pre-shaping during rolling, which requires lower axial forces compared to direct final shaping using the embossing teeth 11a, 11b. A second tooth gap 14 for preforming a tooth on the workpiece 5 can, for example, be arranged in the circumferential direction of the mating toothing 4 between two mutually adjacently arranged guide teeth 12 and/or between a guide tooth 12 and an embossing tooth 11a, 11b arranged adjacent thereto in the circumferential direction of the mating toothing 4. In the present case, a tooth gap 13 is formed between a guide tooth 12 and an embossing tooth 11a, 11b arranged adjacent thereto in the circumferential direction of the mating toothing 4, which gap has substantially the same shape as a tooth gap 13 between two embossing teeth 11a, 11b.

Thus, due to the different configuration of the teeth 11a, 11b, 12 of the mating toothing 4, axial process forces are reduced, whereby the service life of the device 1, e.g., the tool 2, is improved. At the end of production of the spur toothing, e.g., at the end of the axial feed travel of the tool holder 3, the tool 2 has wobbled so often that the mating toothing 4 of the tool 2 has completely formed every tooth or tooth gap on the workpiece 5. In other words, each tooth on the workpiece 5 is formed at least once by a pair of embossing teeth 11a, 11b and a tooth gap 13 arranged therebetween by wobbling rolling.

Furthermore, it should be noted here that the tooth roots of all the teeth 11a, 11b, 12 are of substantially identical configuration. In comparison to the embossing teeth 11a, 11b, the guide teeth 12 are merely cropped at the tooth tip, such that they are shorter in the axial direction of the tool 2. The deeper tooth gaps 14 act as material recesses into which the material of the workpiece 5 can flow for pre-shaping, and when this material meets a tooth gap 13 between two embossing teeth 11a, 11b or between an embossing tooth 11a, 11b and a guide tooth 12, it is brought into a near-net shape or into the final shape. In the present case, the final shape of the respective tooth on the workpiece 5 is created when the material of the workpiece 5 is plastically deformed into the desired final shape by a pair of embossing teeth 11a, 11b with a corresponding tooth gap 13.

REFERENCE NUMERALS

1 Device
2 Tool
3 Tool holder

4 Mating toothing on the tool
5 Workpiece
6 Drive axis
7 Longitudinal axis of the tool
8 Wobble point
9 Tooth base plane
10 Angle
11a, 11b Embossing tooth
12 Guide tooth
13 Tooth gap
14 Tooth gap
15 Direction of longitudinal displacement of the tool holder
16 Shank
17 Radially widened region of the tool
18 End face of the workpiece
19 Bore
U Circumferential direction

The invention claimed is:

1. A device for producing a spur toothing, comprising:
a tool holder arranged for rotational drive about a drive axis and longitudinal displacement along the drive axis; and
a tool arranged on the tool holder, the tool comprising:
an end face;
a mating toothing disposed on the end face and arranged for forming a spur toothing on a workpiece, the mating toothing comprising a tooth base plane; and
a longitudinal axis arranged at an angle to the drive axis such that the longitudinal axis meets the drive axis at a wobble point, wherein the wobble point is disposed on the drive axis in front of or behind the tooth base plane such that, through rotary drive and longitudinal displacement of the tool holder with the associated wobbling rolling of the tool on the workpiece, the spur toothing formed by the mating toothing has a first number of teeth that is unequal to a second number of teeth of the mating toothing, and the mating toothing comprises a plurality of embossing teeth and a plurality of guide teeth.

2. The device of claim 1, wherein the wobble point is offset relative to the tooth base plane in a direction of the tool holder, such that the first number of teeth of the spur toothing is smaller than the second number of teeth of the mating tooling.

3. The device of claim 1, wherein the wobble point is offset relative to the tooth base plane in a direction opposite the tool holder, such that the first number of teeth of the spur toothing is greater than the second number of teeth of the mating tooling.

4. The device of claim 1, wherein the mating toothing comprises:
a plurality of radially extending teeth arranged circumferentially; and
a tooth gap disposed between each adjacent pair of the plurality of radially extending teeth.

5. The device of claim 1, wherein each two of the plurality of embossing teeth arranged adjacent one another in a circumferential direction are spaced apart from one another by a respective tooth gap.

6. The device of claim 5, wherein at least two of the plurality of embossing teeth and at least one of the plurality of guide teeth are arranged alternately in the circumferential direction.

7. The device of claim 1, wherein:
each of the plurality of embossing teeth comprises an embossing tip head;
each of the plurality of guide teeth comprises a guide tip head; and
the embossing tip heads are axially higher than the guide tip heads.

8. The device of claim 1, wherein tooth gaps circumferentially adjacent to each of the plurality of guide teeth are axially deeper than tooth gaps between circumferentially adjacent pairs of the plurality of embossing teeth.

9. A device for producing a spur toothing, comprising a tool holder with a tool arranged thereon, the tool having a mating toothing on an end face for forming a spur toothing on a workpiece, the tool holder being designed for a rotational drive about a drive axis and for longitudinal displacement, a longitudinal axis of the tool being arranged at an angle to the drive axis of the tool holder such that the longitudinal axis of the tool meets the drive axis of the tool holder at a wobble point,
wherein the wobble point is offset relative to a tooth base plane of the mating toothing of the tool along the drive axis in front of or behind the tooth base plane in such a way that, through rotary drive and longitudinal displacement of the tool holder with the associated wobbling rolling of the tool on the workpiece, a toothing with a first number of teeth that is unequal to a second number of teeth of the mating toothing of the tool is produced on the workpiece, and the mating toothing comprises a plurality of embossing teeth and a plurality of guide teeth.

10. The device according to claim 9, wherein the wobble point is offset relative to the tooth base plane of the mating toothing of the tool along the drive axis in a direction of the tool holder, such that, when the mating toothing rolls with wobble on the workpiece, the first number of teeth is less than the second number of teeth.

11. The device according to claim 9, wherein the wobble point is offset relative to the tooth base plane of the mating toothing of the tool along the drive axis in a direction opposite to the tool holder, such that, when the mating toothing rolls with wobble on the workpiece, the first number of teeth that is greater than the second number of teeth.

12. The device according to one of claim 9, wherein the mating toothing has a plurality of teeth which are arranged adjacent one another in a circumferential direction and which extend in a radial direction, wherein every two teeth arranged adjacent to one another are in each case spaced apart from one another by a tooth gap.

13. The device according to claim 9, wherein the embossing teeth each have a higher tip head in an axial direction of the tool than the guide teeth.

14. The device according to claim 9, wherein tooth gaps between every two guide teeth arranged adjacent one another in a circumferential direction of the mating toothing or between a guide tooth and an embossing tooth arranged adjacent thereto in the circumferential direction of the mating toothing are deeper in an axial direction of the tool than tooth gaps between two embossing teeth.

15. The device according to claim 9, wherein at least two embossing teeth are arranged adjacent one another in a circumferential direction of the mating toothing and spaced apart from one another by a respective tooth gap.

16. The device according to claim 15, wherein at least two embossing teeth and at least one guide tooth are arranged alternately in a circumferential direction of the mating toothing.

17. A method for producing a spur toothing, comprising:
providing a device for producing the spur toothing, the device comprising a tool holder with a tool arranged thereon, the tool having a mating toothing on an end face for forming the spur toothing on a workpiece, the tool holder configured for rotational drive about a drive axis and for longitudinal displacement, a longitudinal axis of the tool being arranged at an angle (W) to the drive axis of the tool holder such that the longitudinal axis of the tool meets the drive axis of the tool holder at a wobble point, and the wobble point is offset relative to a tooth base plane of the mating toothing of the tool along the drive axis in front of or behind the tooth base plane,
axially displacing the tool holder in a direction of the workpiece and rotationally driving the tool holder about the drive axis thereof, such that the tool rolls with wobble on a surface of the workpiece so that a toothing with a first number of teeth which is not equal to a second number of teeth of the mating toothing of the tool is formed on the workpiece, and the mating toothing comprises a plurality of embossing teeth and a plurality of guide teeth.

\* \* \* \* \*